United States Patent
De Muelenaere et al.

(10) Patent No.: US 9,605,475 B2
(45) Date of Patent: Mar. 28, 2017

(54) SLAT STRUCTURE

(71) Applicant: RENSON SUNPROTECTION-SCREENS NV, Waregem (BE)

(72) Inventors: Rino Francky De Muelenaere, Oekene (BE); Bart Pieter Jules Abeel, Sint-Eloois-Winkel (BE)

(73) Assignee: RENSON SUNPROTECTION-SCREENS NV, Waregem (BE)

( * ) Notice: Subject to any disclaimer, the term of this patent is extended or adjusted under 35 U.S.C. 154(b) by 0 days.

(21) Appl. No.: 14/896,663

(22) PCT Filed: Jun. 6, 2014

(86) PCT No.: PCT/IB2014/062013
§ 371 (c)(1),
(2) Date: Dec. 7, 2015

(87) PCT Pub. No.: WO2014/195916
PCT Pub. Date: Dec. 11, 2014

(65) Prior Publication Data
US 2016/0130865 A1  May 12, 2016

(30) Foreign Application Priority Data

Jun. 7, 2013 (BE) .................................. 2013/0400
Jun. 12, 2013 (BE) .................................. 2013/0417

(51) Int. Cl.
*E06B 9/302* (2006.01)
*E04F 10/10* (2006.01)
(Continued)

(52) U.S. Cl.
CPC ............... *E06B 9/302* (2013.01); *E04F 10/10* (2013.01); *E06B 9/063* (2013.01); *E06B 9/0638* (2013.01);
(Continued)

(58) Field of Classification Search
CPC ........ E06B 9/302; E06B 9/322; E06B 9/0638; E06B 9/0676; E06B 9/368; E06B 9/063; E04F 10/10
See application file for complete search history.

(56) References Cited

U.S. PATENT DOCUMENTS 1,650,134 A * 11/1927 Kintner .................... E06B 9/063
160/34
3,717,195 A * 2/1973 Larranaga ............... E06B 9/302
160/169

(Continued)

FOREIGN PATENT DOCUMENTS

DE   297 03 007 U1   6/1998
EP   2113627         * 11/2009
(Continued)

OTHER PUBLICATIONS

International Search Report dates Oct. 7, 2014.
Written Opinion for PCT/IB2014/062013.

*Primary Examiner* — Blair M Johnson
(74) *Attorney, Agent, or Firm* — Symbus Law Group, LLC; Clifford D. Hyra

(57) ABSTRACT

A nut stacking mechanism (-1-) for the displacement of slats between a stacking zone (L2) and a sliding zone (L1), comprising a spindle (2), on which a nut (3) is displaceable between the stacking zone (L2) and the sliding zone (L1), a rotation stop element (4), to form in the sliding zone (L1), in the rotational direction of the spindle (2), an obstacle for the movement of the nut (3), and a stacking element (5), to form in the stacking zone (L2), in the longitudinal direction (Continued)

of the spindle (2), an obstacle for the movement of the nut (3), wherein, by displacement of at least a part of the rotation stop element (4) and the stacking element (5), the boundary between the stacking zone (L2) and the sliding zone (L1) is provided displaceably in the longitudinal direction of the spindle (2).

17 Claims, 6 Drawing Sheets

(51) Int. Cl.
*E06B 9/36* (2006.01)
*F16H 25/24* (2006.01)
*E06B 9/322* (2006.01)
*E06B 9/06* (2006.01)
(52) U.S. Cl.
CPC ............ *E06B 9/0653* (2013.01); *E06B 9/322* (2013.01); *E06B 9/368* (2013.01); *F16H 25/2454* (2013.01); *E06B 9/0676* (2013.01)

(56) References Cited

U.S. PATENT DOCUMENTS

| | | | | |
|---|---|---|---|---|
| 5,469,905 A | * | 11/1995 | McKinney | E06B 9/0669 160/183 |
| 7,370,684 B2 | * | 5/2008 | Padan | E06B 3/927 160/169 |
| 7,681,620 B2 | * | 3/2010 | Padan | E06B 3/927 160/169 |
| 2006/0113045 A1 | * | 6/2006 | Padan | E06B 3/927 160/201 |

FOREIGN PATENT DOCUMENTS

| | | |
|---|---|---|
| ES | 1 067 845 U | 12/2008 |
| IL | WO 2004/070156 A1 | 8/2004 |
| WO | WO 2015097705 A1 * | 7/2015 |

* cited by examiner

SLAT STRUCTURE

This application claims the benefit of Belgian patent Application No. 2013/0400, filed Jun. 7, 2013, and Belgian patent Application No. 2013/0417 filed Jun. 12, 2013, both of which are hereby incorporated by reference in their entirety.

FIELD OF THE INVENTION

The present invention relates to a slat structure which normally serves as a screen, typically for the at least partial screening of an opening, such as, for example, a door or frame opening, or as a shelter, such as, for example, a flat roof, etc. In slat structures of this type, a plurality of slats are usually arranged virtually parallel to one another, wherein they can extend over a defined surface. Usually there is a displacement mechanism provided for the displacement of the slats between a stacking zone, wherein the slats—if these are virtually all included herein—are located virtually one against another, and a sliding zone, in which the slats can extend distributed over at least a part of the surface.

The present invention relates more specifically to a nut stacking mechanism which serves as a displacement mechanism for the displacement of slats of a slat structure of this type.

BACKGROUND

A slat structure of this type and a nut stacking mechanism of this type are known, for example, from EP 1 595 053 B1.

The drawback of the nut stacking mechanism from EP 1 595 053 B1 is that, when the slats are fully driven out in the sliding zone, an opening is formed between the first slat and a possible construction which is adjoined by the slat structure or forms part of the slat structure. The first slat is the slat which, when the slats are pushed into the stacking zone, first arrives in this stacking zone or remains herein and, when the slats are pushed out, last leaves the stacking zone or remains herein. Generally, this opening will extend between the first slat and that surface of the construction which is closest to the first slat, which surface is virtually parallel to this slat. Adjacent to the surface which is to be screened off, an additional space also needs to be provided as a stacking zone. This opening is often not wanted, since, at the height of this opening, there is no protection against solar radiation or precipitation, or because of safety reasons, or because of aesthetic requirements. In these cases, a separate permanent screening needs to be provided for this opening. This is in many cases undesirable.

SUMMARY

The object of the present invention is to prevent the formation of an opening or to limit the opening, as the slats are pushed out, between the first slat and that side of the surface of a possible adjacent construction which is arranged closest to the first slat and extends virtually parallel to this first slat.

This object is achieved by providing a nut stacking mechanism for the displacement of slats between a stacking zone and a sliding zone, comprising:
  a rotatable spindle having an external screw thread with pitch P1, which spindle extends along the stacking zone and the sliding zone;
  at least one movable nut per said displaceable slat, having an internal screw thread with pitch P1, which nut is fastened on the said spindle and is displaceable between the stacking zone and the sliding zone;
  at least one rotation stop element, which is designed to act on the movable nut in the sliding zone to form, viewed only in the rotational direction of the spindle, an obstacle for the movement of the nut to prevent absolute rotation of the nut about the spindle and allow movement of the nut, viewed in the longitudinal direction of the spindle;
  at least one stacking element, which is designed to act in the stacking zone on the movable nut to form, viewed only in the longitudinal direction of the spindle, an obstacle for the movement of the nut in order to limit movement of the nut, viewed in the longitudinal direction of the spindle, and allow absolute rotation of the nut about the spindle;
wherein at least a part of the rotation stop element is arranged displaceably, viewed in the longitudinal direction of the spindle, and wherein the stacking element is arranged displaceably to provide, by displacement of at least a part of the rotation stop element and the stacking element, the boundary between the stacking zone and the sliding zone displaceably in the longitudinal direction of the spindle.

When the nut is moved in the longitudinal direction of the spindle (slides along the spindle), it will constantly rotate in relative terms about the spindle, but not necessarily in absolute terms. Where the rotation stop element acts on the nut, absolute rotation is prevented, but relative rotation remains possible, whereby the nut can move in the longitudinal direction of the spindle (slide along the spindle). Where the stacking element acts on the nut, relative rotation is limited or prevented, so that movement of the nut in the longitudinal direction (sliding along the spindle) is limited or prevented.

Embodiments hereof comprising, for example, chains, (toothed) belts, gear systems, etc., which ensure the displacement of at least a part of the rotation stop element, are in this context conceivable. As will further be evident, other displacement means, too, are possible.

Embodiments hereof having, for example, chains, (toothed) belts, gear systems, etc. which guarantee the displacement of the stacking element, are in this context conceivable. As will further be evident, other displacement means, too, are possible.

Just as in the prior art, each movable slat of a slat structure can be easily fastened to a movable nut of this type and arranged so as to be jointly displaceable (and possibly rotatable) with this nut. The slats are hence displaceable separately from one another and can each be received in the stacking zone, or removed from here, at a different moment.

If a nut stacking mechanism according to the invention is used, the boundary between the stacking zone and the sliding zone advances with the number of slats which arrives in the stacking zone. The slats which are present in the stacking zone together demarcate the space occupied by the stacking zone. The sliding zone and the stacking zone thus have a variable length where, in the prior art, they had a fixed length.

In a particularly preferred embodiment of a nut stacking mechanism according to the present invention, the stacking element is provided to prevent movement of the nut, viewed in the longitudinal direction of the spindle.

In an embodiment of this type, the nut is no longer further displaced in the stacking zone, but is stopped at its desired position. The final spacing in the stacking zone between slats of a slat structure which have been displaced with such a nut stacking mechanism was defined in the prior art by that pitch of the external screw thread of the nut which was necessary to be able to displace the nut in the stacking zone. Since the nut in this embodiment according to the invention is no longer displaced in the stacking zone, this limitation is dispensed with, so that slats of a slat structure which are displaced with such a nut stacking mechanism can be parked (stationed) in the stacking zone at the desired position, such that an opening between the first slat and that side of the surface of the construction which is closest to the first slat is a clearly defined invariable distance. The slats which are present in the stacking zone together demarcate the space occupied by the stacking zone.

In embodiments in which the stacking element does not prevent, but does limit sliding of the movable nut along the spindle, it will be possible to ensure, by the movement made by the stacking element, that the opening formed, as the slats are pushed out, between the first slat and that side of the surface of a possible adjacent construction which is arranged closest to the first slat and extends virtually parallel to the first slat is limited compared with similar openings in the prior art.

The rotation stop element of a nut stacking mechanism according to the present invention can be realized such that, when at least a part of the rotation stop element is displaced towards the stacking zone, it acts on the movable nut. In an embodiment of this type, the boundary between the stacking zone and the sliding zone is then defined by the position of the rotation stop element and the relative velocity at which the movable part thereof moves.

More specifically, the complete rotation stop element can be arranged displaceably, viewed in the longitudinal direction of the spindle.

Furthermore, the movable nut can comprise, in particular, a notch in its periphery or external screw thread, and the rotation stop element is then designed to engage in this notch to prevent rotation of the movable nut.

Alternatively, the movable nut can also be provided on its periphery with a projection, for example, wherein the rotation stop element comprises a cavity in which this projection can engage to prevent rotation of the movable nut.

In a particular embodiment, the stacking element can be arranged displaceably, viewed in the longitudinal direction of the spindle.

In a particular nut stacking mechanism according to the present invention, the movable nut comprises a flange, and the stacking element is designed to engage behind this flange to prevent sliding of the movable nut.

In an alternative particular embodiment of a nut stacking mechanism according to the present invention, the nut is provided with an external screw thread with pitch P2, and the stacking element is designed to engage in the external screw thread of the nut.

In a particular nut stacking mechanism having such externally threaded nuts, the stacking element comprises teeth with pitch P2 equal to the pitch P2 of the external screw thread of the nut.

Yet more specifically, in a first specific embodiment the rotation stop element and the stacking element here form part of a same displaceable lath, wherein an untoothed part of this lath forms the rotation stop element and a toothed part of this lath forms the stacking element, which toothed part is provided with a toothing with pitch P2. The stacking element is designed to engage in the external screw thread of the nut in order to limit or prevent sliding of the movable nut. Both the rotation stop element and the stacking element are here displaceable, as part of this lath, in the longitudinal direction of the rotatable spindle. The displacement of the partly toothed lath is here opposite to the displacement of the nuts in the sliding zone. The velocity at which the partly toothed lath is displaced defines the velocity of the nuts in the stacking zone. Given a suitable choice of this velocity, it is ensured that nuts which are received in the stacking zone stand still in the longitudinal direction of the rotatable spindle (though they can still rotate).

Preferably, in an embodiment of this type, the untoothed part is constructed thinner than the toothed part of the lath.

In a second specific embodiment of a nut stacking mechanism according to the present invention, the displaceable part of the rotation stop element and the stacking element form part of a movable chain comprising a zone B and a zone A, wherein this chain, at least at the height of the stacking zone, runs parallel with the rotatable spindle, wherein the chain in zone A comprises links which are realized as the stacking element and, for this purpose, comprise teeth to engage in the external screw thread of the movable nut, and wherein the chain in zone B comprises links which are realized as the rotation stop element.

The displaceability of at least a part of the rotation stop element is provided in a third specific embodiment by virtue of the fact that it comprises a second rotatable spindle, having an external screw thread with pitch P2, comprises a second nut, with internal screw thread P2, with which the rotation stop element is movably fastened to this second spindle, whereby movement of the second nut in the rotational direction of the second spindle is prevented, so that absolute rotation of the second nut and the rotation stop element with respect to the second spindle is prevented and movement of the second nut and the rotation stop element in the longitudinal direction of this second spindle is unhindered.

In a fourth specific embodiment of a nut stacking mechanism according to the present invention, the rotation stop element and the slide stop element form part of a lever. The nut is here placed in a bearing. The lever comprises a cavity, which extends through the lever and into which the nut and the bearing extend. The lever is further arranged tiltably with respect to the nut between a first position and a second position. The lever is here constructed such that in the first position the bearing is locked by friction, so that the lever serves as a rotation stop element, and in the second position the nut is freely mounted, so that the lever serves as a slide stop element.

Preferably, a nut stacking mechanism of this type further comprises an activation element, which is arranged displaceably in a direction virtually parallel to the rotatable spindle in order to act on the lever to tilt this between its first position and its second position.

More specifically, a nut stacking mechanism of this type can comprise, for this purpose, a second rotatable spindle, having an external screw thread with pitch P2, wherein the activation element is movably fastened to this second spindle with the aid of a second nut having an internal screw thread P2.

The object of the present invention is further also achieved by the provision of a slat structure having a nut stacking mechanism for the displacement of slats between a stacking zone and a sliding zone, wherein the nut stacking mechanism is a nut stacking mechanism according to the present invention.

In addition to the said displaceable slats, which are displaceable with the aid of the nut stacking mechanism according to the invention, a slat structure of this type can also comprise other slats.

BRIEF DESCRIPTION OF THE DRAWINGS

The present invention is now described more closely on the basis of the following detailed description of a few preferred embodiments of nut stacking mechanisms according to the present invention for slat structures according to the present invention. The aim of this description is solely to provide illustrative examples and to indicate further advantages and peculiarities of these nut stacking mechanisms and slat structures, and cannot therefore be interpreted as a limitation of the field of application of the invention or of the patent rights claimed in the claims.

In this detailed description, reference is made by means of reference numerals to the appended drawings, wherein in FIG. 1 a basic diagram of a first embodiment of a nut stacking mechanism according to the present invention is represented in side view.

DETAILED DESCRIPTION

Figure 1:
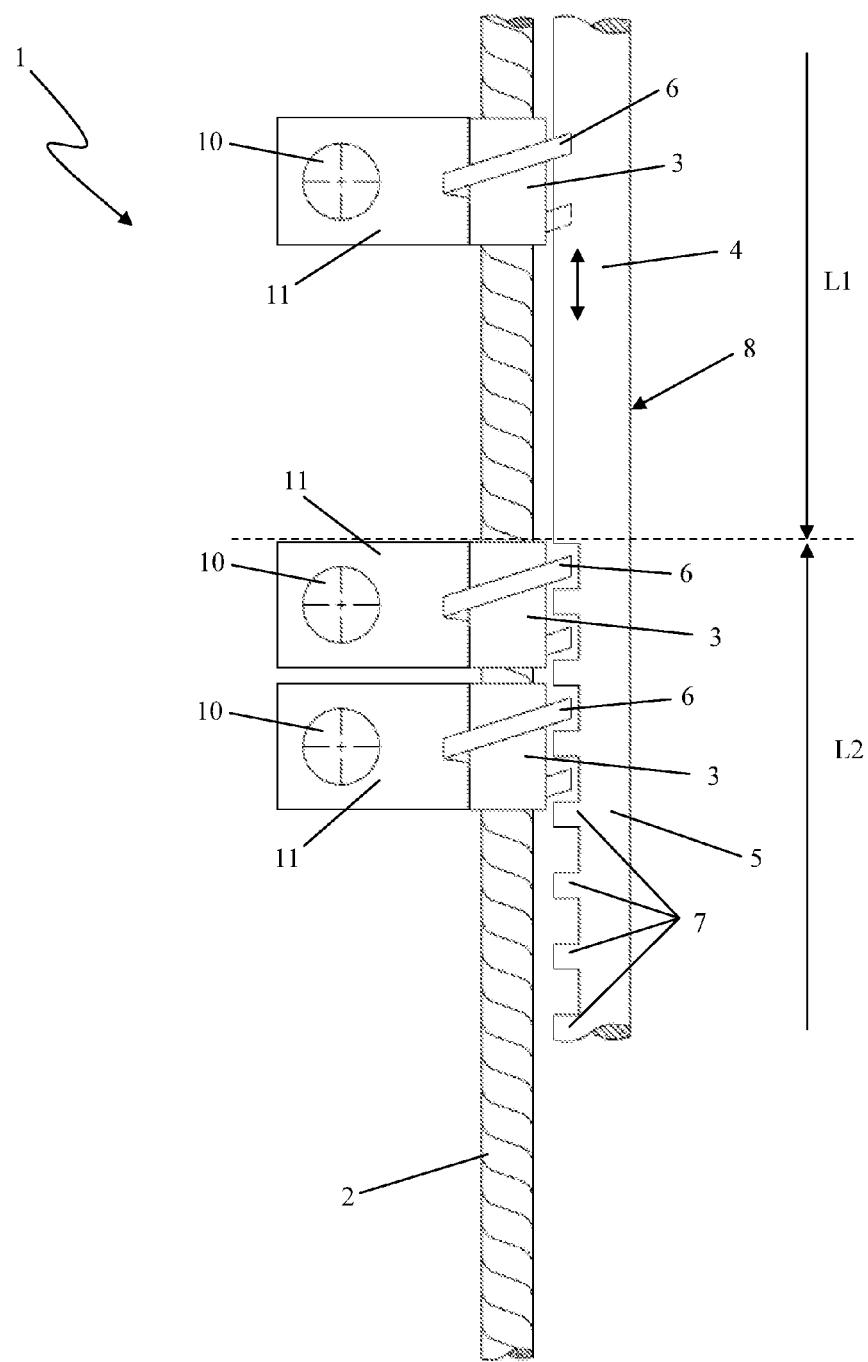
Figure 2:
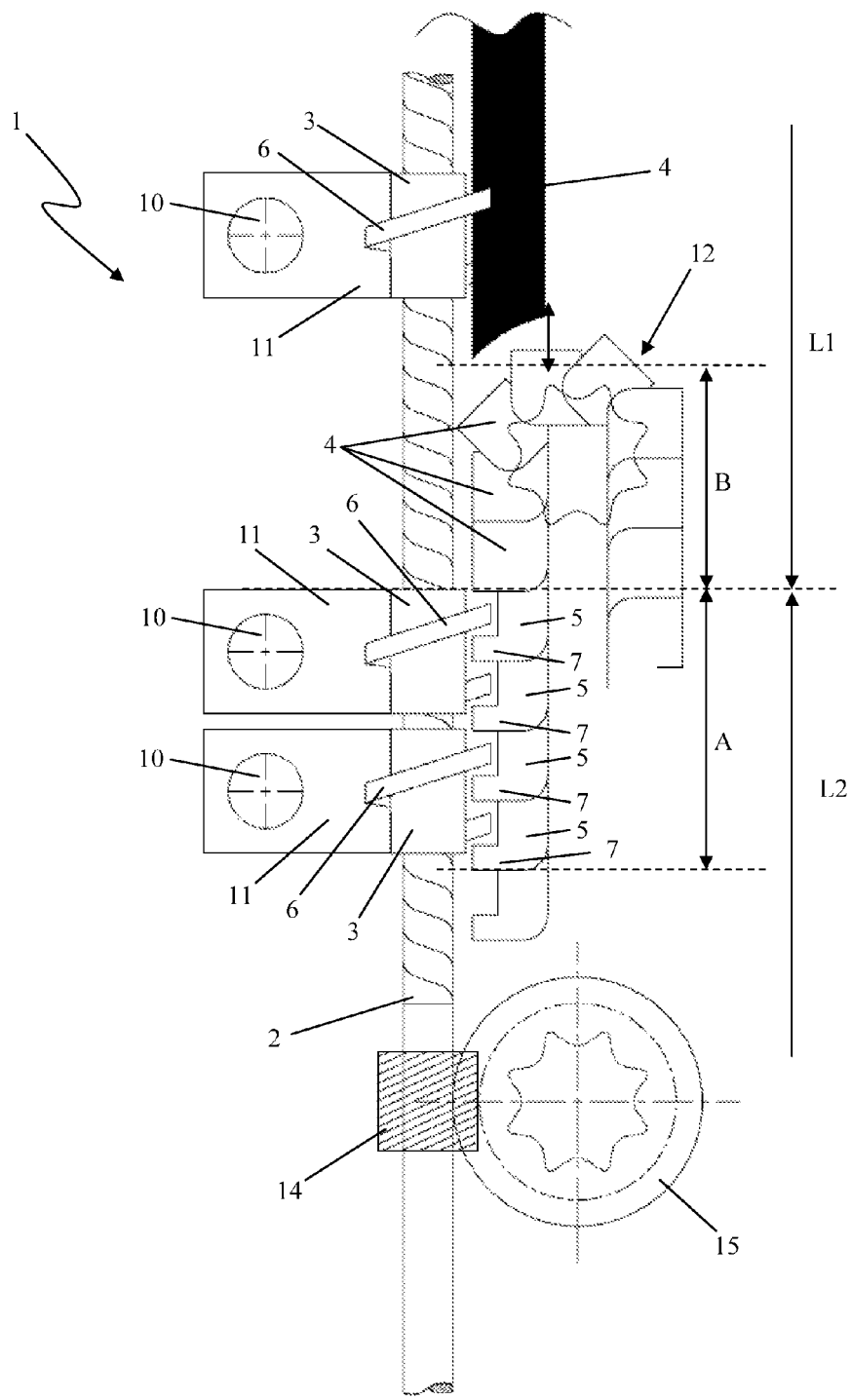
FIG. 2 a basic diagram of a second embodiment of a nut stacking mechanism according to the present invention is represented in side view.

The various portrayed nut stacking mechanisms (1) are intended for inclusion in a slat structure.

A slat structure of this type typically comprises a plurality of slats, which are arranged virtually parallel to one another. These slats are generally rotatable about a shaft (10). The shafts (10) of the slats are generally arranged in a plane, so that the slats can together at least partially close off an opening according to this plane or can form a shelter or a wall, etc. A plane of this type can here extend in virtually any position between the horizontal and the vertical position.

With the aid of a nut stacking mechanism (1), the slats can also be displaced in the said plane between a stacking zone (L2), in which the slats—if these are virtually all accommodated herein—are located virtually one against the other, and a sliding zone (L1), in which they at least partially screen off the said opening. For this purpose, a nut stacking mechanism (1) is arranged on both lateral sides of the slats. The portrayed nut stacking mechanisms (1) are disposed on one lateral side of the slats. A similar nut stacking mechanism (1) is then arranged on the opposite lateral side of the slats. The rotational movement of the further discussed spindles (2) of these nut stacking mechanisms (1), which spindles correspond on both sides, is then synchronously driven with the aid of, for example, an electric motor.

The nut stacking mechanisms (1) respectively comprise a rotatable spindle (2) having an external screw thread with pitch P1. This spindle (2) extends on the lateral sides of the slats along both the stacking zone (L2) and the sliding zone (L1), as can be seen in FIGS. 1, 2, 5 and 7.

On the rotatable spindle (2) is placed, for each slat, a movable nut (3) having an internal screw thread with pitch P1.

In the first three embodiments, each movable nut (3) is placed rotatably in a transport element (11). In the last embodiment, each nut (3) is placed in a lever (26). This lever (26) is articulately connected to a transport element (11).

In all embodiments, in each transport element (11) is also placed the shaft (10) of the corresponding slat. If the slats need to be rotatable about their shaft (10), this slat shaft (10) can be provided rotatably in this transport element (11).

If a nut (3) is displaced in the longitudinal direction with respect to the spindle (2), it transports in its movement the corresponding transport element (11), which in turn transports the shaft (10) of the corresponding slat, and thus also the slat itself.

Figure 4:
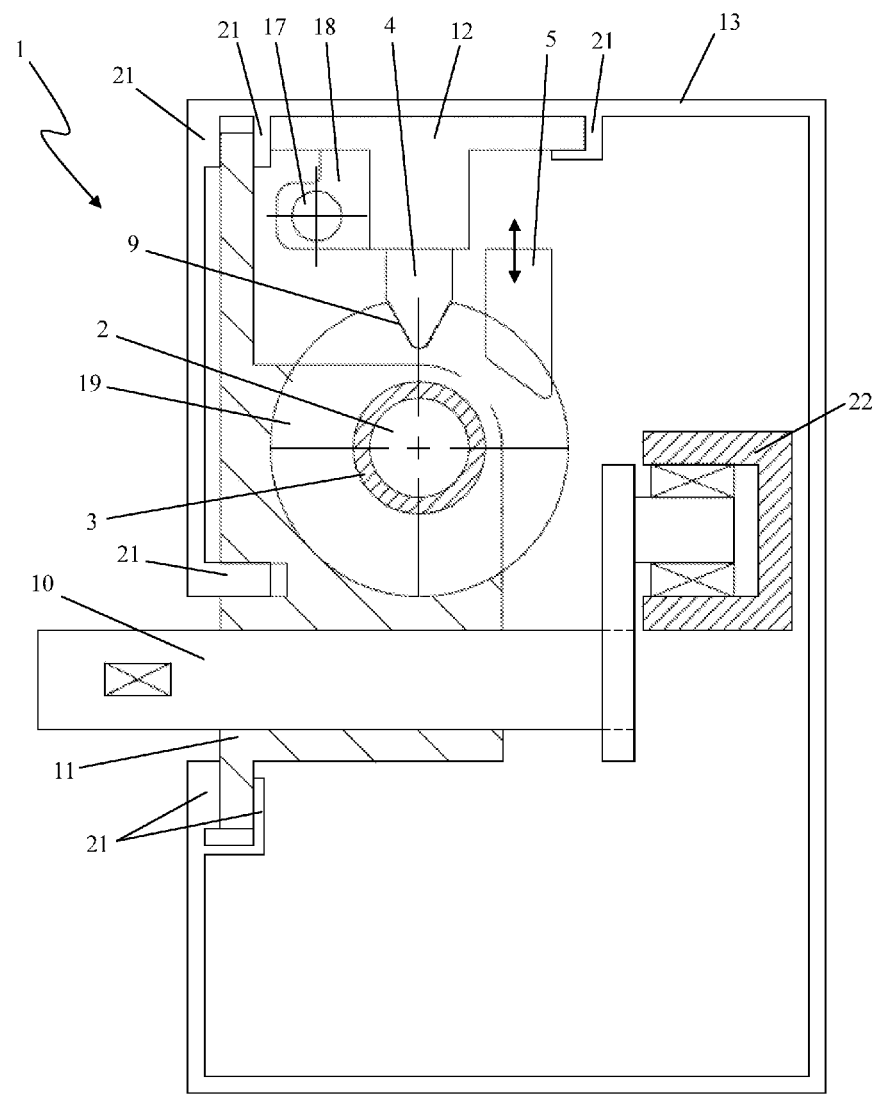
FIG. 4 a third embodiment of a nut stacking mechanism according to the present invention is represented in cross section.
Figure 5:
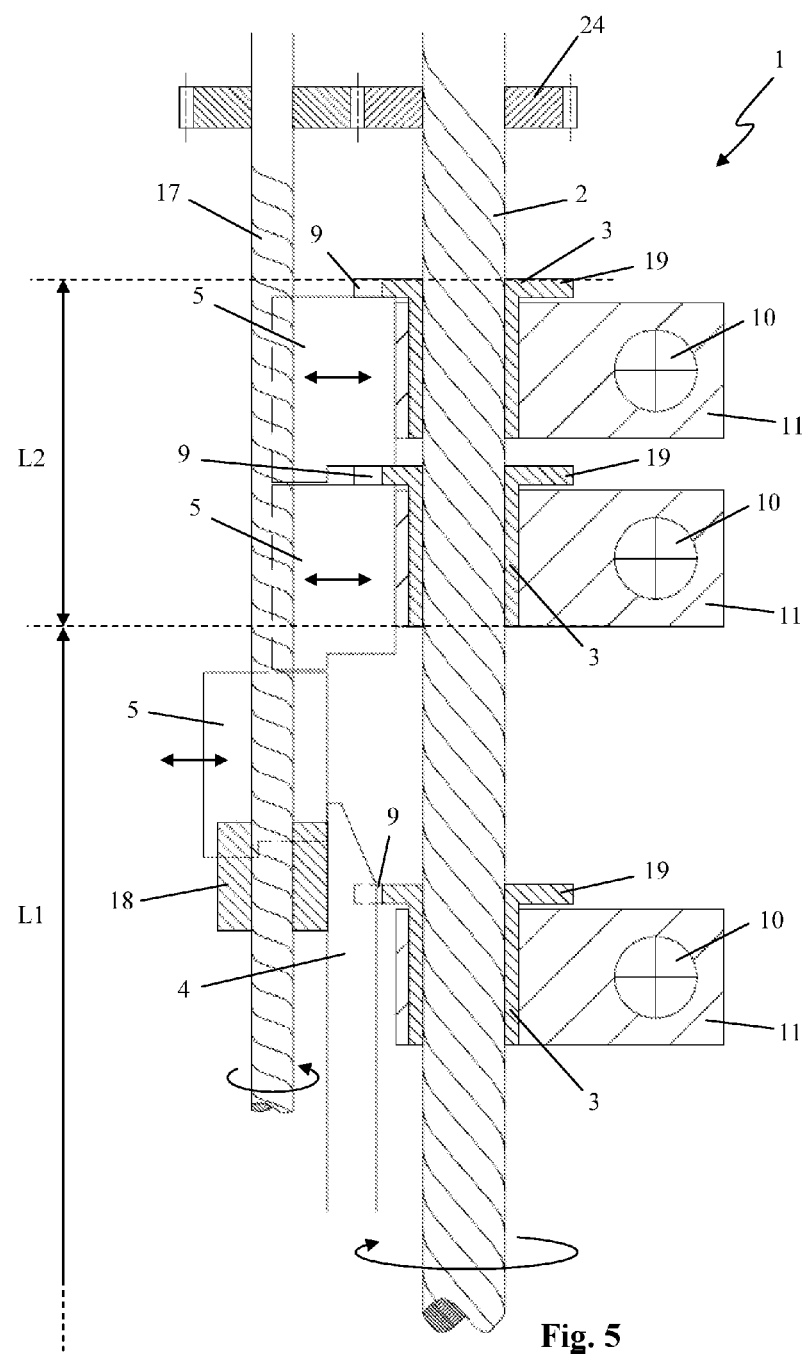
FIG. 5 the nut stacking mechanism from FIG. 4 is represented in side view.

The movement of the transport element (11) is directed such that it can shift, but not rotate. In the third embodiment, this is realized with the aid of guide elements (21), which form part of the housing (13) in which the nut stacking mechanism (1) is accommodated (see FIGS. 4).

Figure 3:
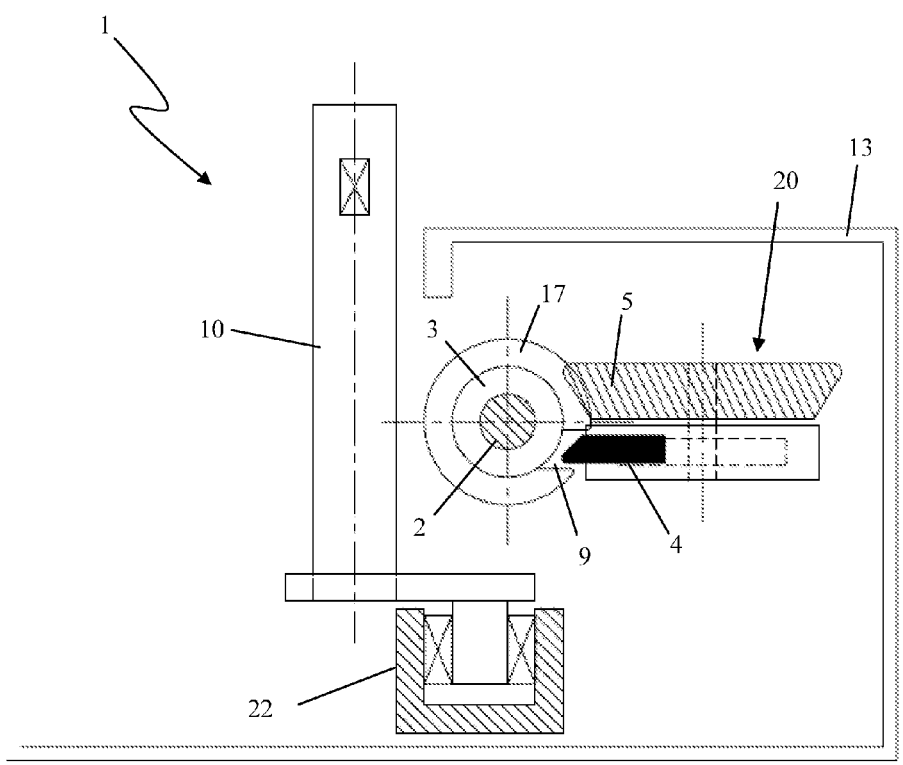
FIG. 3 a basic diagram of the nut stacking mechanism from FIG. 2 is represented in cross section.

In the first two embodiments, the movable nut (3) is further provided with an external screw thread (6) with pitch P2. In the external screw thread (6) is provided a notch (9), as can be seen in FIG. 3.

In the first portrayed embodiment, the stacking element (5) is a part of a movable toothed lath, which is provided with teeth at the site of the stacking element (5). In the second portrayed embodiment of a nut stacking mechanism (1) according to the present invention, the stacking element (5) is a part of a movable chain (12).

In the first portrayed embodiment, the rotation stop element (4) and the stacking element (5) form part of a partly toothed lath (8). The untoothed part (4) of the lath (8) is thinner than the toothed part (5). The untoothed part (4) of the lath (8) engages in the sliding zone (L1) in the notch (9) of the external screw thread (6) of the nut (3). The width of the notch (9) of the external screw thread (6) is thus larger than the thickness of the untoothed part (4) of the lath (8). The absolute rotation of the nuts (3) about the spindle (2) is hereby prevented. The nuts (3) can slide along the spindle (2) at a velocity v1, wherein, in one revolution of the spindle (2), the nut (3) covers a distance which is equal to the pitch P1 of the spindle (2). The nuts (3) here rotate relatively with respect to the spindle (2). The sliding zone (L1) becomes larger and the stacking zone (L2) smaller as the presence of slats in the stacking zone (L2) becomes less.

The toothed part (5) of the lath (8) has a pitch P2 equal to the pitch of the external screw thread (6) of the nut (3). The thickness of the toothed part (5) of the lath (8) is larger than the width of the notch (9) of the external screw thread (6) of the nut (3). The nuts (3) are hence able both to rotate absolutely about the spindle (2) and to slide along the spindle (2) at a velocity v2, different from v1. If the toothed part (5) of the lath (8) is displaced at a velocity different from v2, the velocity at which the nuts (3) slide can be altered. If the toothed part (5) of the lath (8) is displaced at a same velocity v2 but oppositely to the sliding direction of the nuts (3) along the spindle (2), the nuts (3), according to the longitudinal axis of the spindle (2), stand still in the stacking zone (L2) (though they can still rotate).

The partly toothed lath (8) needs to be able to be displaced over the full height of the spindle (2) and to be able to act on the nuts (3). Where there is sufficient space for this and this forms no obstacle from a construction engineering or aesthetic viewpoint, a zone next to the sliding zone (L1) and/or a zone next to the stacking zone (L2) can be provided for this purpose, into which the partly toothed lath (8) can extend if this, during its sliding movement, extends further than the sliding zone (L1) and/or further than the stacking zone (L2). In order to avoid a situation in which, for this purpose, a zone needs to be provided next to the sliding zone (L1) and/or next to the stacking zone (L2), this lath (8) could, for example, be telescopically constructed or flexibly constructed, and form part of a belt device or a chain device, caterpillar track etc.

The second portrayed embodiment comprises a two-part rotation stop element (4). A first and fixedly arranged rotation stop element (4) is realized in the form of a lath (4). A second and movably arranged rotation stop element (4) is realized in the form of chain links (4) having a thickness smaller than the width of the notch (9) in the external screw thread (6) of the nut (3). In the sliding zone (L1), the links (4) engage in this notch (9) of the external screw thread (6). The absolute rotation of the nuts (3) about the spindle (2) is hereby prevented. The nuts (3) can, though, slide along the spindle (2) at a velocity v1, whereupon they rotate relatively with respect to the spindle (2).

The stacking element (5) consists of chain links (5) which are thicker than the width of the notch (9) of the external screw thread (6) of the nut (3). These chain links (5) have teeth (7) with pitch P2, so that the nuts (3) are able both to rotate about the spindle (2) and to slide along the spindle (2) at a velocity v2 different from v1. The chain (12) is driven via a worm-worm gear transmission (14, 15) by the first spindle (2).

In the first two embodiments, the rotation stop element (4) engages in the sliding zone (L1) in the notch (9) of the nuts (3) which are at that moment present in this sliding zone (L1). In the second embodiment, the nuts (3), upon displacement towards the stacking zone (L2), are first acted on by the fixedly arranged rotation stop element (4) and afterwards by the chain links (4) serving as the rotation stop element (4). With the aid of the rotation stop elements (4), in the first two embodiments absolute rotation of the particular nuts (3) about the spindle (2) is prevented. These nuts (3) are able to slide along the spindle (2) and to hereupon rotate relatively with respect to the spindle (2). These nuts (3) cannot therefore co-rotate with the spindle (2) in this sliding zone (L1), but, upon rotation of the spindle (2), will shift in the longitudinal direction with respect to the spindle (2). The nuts (3) successively arrive at a point at which the rotation stop element (4) no longer engages in their notch (9). At this point, the particular nut (3) is received in the variable stacking zone (L2) by engagement of the respective teeth (7) of the stacking element (5) in its external screw thread (6).

The last two portrayed nut stacking mechanisms (1) comprise, in addition to the said first rotatable spindle (2), also a second rotatable spindle (17, 28), having an external screw thread with pitch P2. This second spindle (17, 28) extends virtually parallel to the first spindle (2). Via a gear transmission (24), in the last two portrayed embodiments the rotational movement of the first spindle (2) is transmitted to an opposite rotational movement of the second spindle (17, 28).

In the third portrayed embodiment, on this second spindle (17) is placed a second movable nut (18) having an internal screw thread with pitch P2. This second movable nut (18) is fixedly connected to a second transport element (12). A blade-shaped rotation stop element (4) is in turn fixedly connected to this second transport element (12). The movement of the transport element (12) is directed with the aid of guide elements (21) which form part of the housing (13) in which the nut stacking mechanism (1) is accommodated, so that this transport element (12) can shift, but not rotate.

The blade-shaped rotation stop element (4) needs to be able to be displaced over the complete sliding zone (L1) and to be able to act on the first nuts (3). Where there is sufficient space for this and this forms no obstacle from a construction engineering or aesthetic viewpoint, a zone next to the sliding zone (L1) can be provided for this purpose, into which the blade-shaped rotation stop element (4) can extend during its sliding movement out of the sliding zone (L1). In order to avoid a situation in which, for this purpose, a zone needs to be provided next to the sliding zone (L1), this blade-shaped rotation stop element (4) could, for example, be telescopically constructed or flexibly constructed, and form part of a belt device or a chain device, caterpillar track etc.

In this third portrayed embodiment, the first nuts (3) are provided with a flange (19), in which a notch (9) is placed on the periphery of this flange (19). The blade-shaped rotation stop element (4) engages in the sliding zone (L1) in this notch (9) of the first movable nuts (3) which are at that moment present in this sliding zone (L1). Absolute rotation of the particular first nuts (3) about the spindle (2) is hereby prevented. These first nuts (3) are able to slide along the spindle (2) and to hereupon rotate relatively with respect to the spindle (2). These first nuts (3) cannot therefore co-rotate with the first spindle (2) in this sliding zone (L1), but, upon rotation of the first spindle (2), will shift in the longitudinal direction with respect to the first spindle (2).

By rotating the first spindle (2) and the second spindle (17) in opposite direction, the slats and the blade-shaped rotation stop element (4) are displaced in the opposite direction. Thus, when the slats are displaced from the sliding zone (L1) towards the stacking zone (L2), the first nuts (3) successively arrive at a point at which the rotation stop element (4) no longer engages in their notch (9). At this point, the particular first nut (3) is received in the stacking zone (L2).

For this purpose, the nut stacking mechanism (1) comprises a stacking element (5) for each slat. This stacking element (5) is displaceable towards the first rotatable spindle (2) and away herefrom, as is indicated with the arrows. The displacement of these stacking elements (5) is driven such that, when such a stacking element (5) is displaced towards the first rotatable spindle (2), this engages behind the flange (19) of the corresponding first nut (3). This drive can be realized, for example, with the aid of a spring. In this way, this stacking element (5) prevents the corresponding first nut (3) from being further displaced in the longitudinal direction with respect to the first spindle (2). This stacking element (5) allows the corresponding first nut (3) to be able to rotate absolutely about the first spindle (2).

Figure 6:
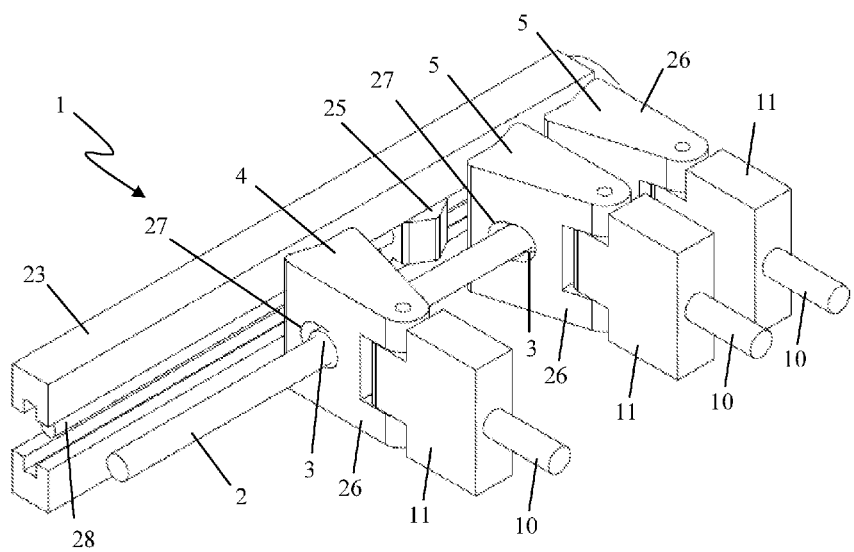
FIG. 6 a fourth embodiment of a nut stacking mechanism according to the present invention is represented in perspective.
Figure 7:
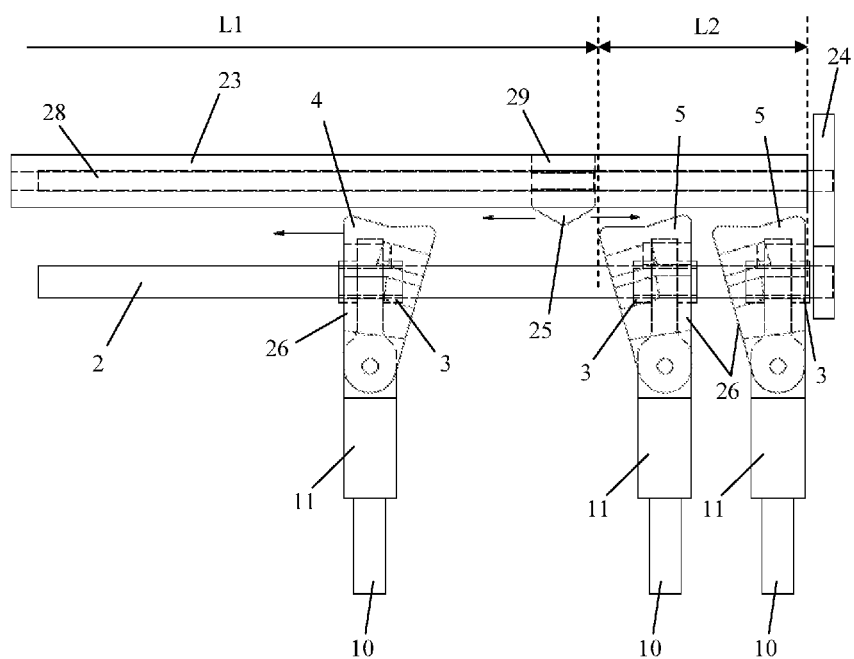
FIG. 7 the nut stacking mechanism from FIG. 6 is represented in side view.

In the last portrayed embodiment, the first movable nut (3) is accommodated in a bearing. The first movable nut (3) and the bearing are accommodated in a cavity (27) of the lever (26). This cavity (27) extends through the lever (26). The cavity (27) is shaped such that the lever (26), which is articulately connected to the transport element (11), is tiltable between a first position, as in FIGS. 6 and 7 in respect of the lever (26) arranged furthest to the left, and a second position, as in FIGS. 6 and 7 in respect of the two levers (26) arranged on the right.

In the first position, the bearing is locked in the cavity (27) by friction. This can be realized in known ways by adapting the shaping of this cavity (27) for this purpose and/or by providing, for example, a spring locking mechanism and/or by providing, for example, locking rollers in the cavity. In this first position, the lever (26) thus serves as a rotation stop element (4), by, through locking of the bearing, acting on the first movable nut (3) to prevent absolute rotation of this movable nut (3). The movable nut (3) can here only rotate relatively with respect to the first spindle (2), so that it is displaced in the longitudinal direction of the spindle (2) upon rotation of the spindle (2).

In the second position, the first movable nut (3) is freely mounted, so that the lever (26) serves as a stacking element (5), wherein the nut (3) can rotate freely and movement of the nut (3) in the longitudinal direction with respect to the first spindle (2) is prevented.

The tilting movement of the lever (26) between its first position and its second position can be supported with the aid of a spring-loaded element, so that the switchover between the two positions is realized with minimal time.

In this last embodiment, a second movable nut (29), having an internal screw thread with pitch P3, is also likewise placed on the second spindle (28). On this second movable nut (28) is here provided an activation element or cam (25), which can act on the lever (26) to tilt this between its first position and its second position. This second movable nut (28) is guided during its movement in a guide (23).

In all embodiments, when a first nut (3) is received in the stacking zone (L2)—wherein the slat connected thereto is thus also received in the stacking zone (L2)—this stacking zone (L2) grows, whilst the sliding zone (L1) declines. The first slat, which, viewed when the slats are pushed out of the stacking zone (L2), is arranged as the last, can be provided to leave this stacking zone (L2) or not. Upon displacement of the slats from the stacking zone (L2), the different movable parts move in the reverse direction, wherein the slats are successively received in the sliding zone (L1). The stacking zone (L2) then becomes increasingly small, whilst the sliding zone (L1) grows.

The invention claimed is:

1. Nut stacking mechanism for the displacement of slats between a stacking zone and a sliding zone, comprising:
   a rotatable spindle having an external screw thread with pitch P1, which spindle extends along the stacking zone and the sliding zone;
   at least one movable nut per said displaceable slat, having an internal screw thread with pitch P1, which nut is fastened on the said spindle and is displaceable between the stacking zone and the sliding zone;
   at least one rotation stop element, which is designed to act in the sliding zone on the movable nut to form, viewed only in the rotational direction of the spindle, an obstacle for the movement of the nut to prevent absolute rotation of the nut about the spindle and allow movement of the nut, viewed in the longitudinal direction of the spindle;
   at least one stacking element, which is designed to act in the stacking zone on the movable nut to form, viewed only in the longitudinal direction of the spindle, an obstacle for the movement of the nut in order to limit movement of the nut, viewed in the longitudinal direction of the spindle, and allow absolute rotation of the nut about the spindle;
   wherein at least a part of the rotation stop element is arranged displaceably, viewed in the longitudinal direction of the spindle, and
   wherein the stacking element is arranged displaceably to provide, by displacement of at least a part of the rotation stop element and the stacking element, the boundary between the stacking zone and the sliding zone displaceably in the longitudinal direction of the spindle.

2. Nut stacking mechanism according to claim 1, characterized in that the stacking element is provided to prevent movement of the nut, viewed in the longitudinal direction of the spindle.

3. Nut stacking mechanism according to claim 1, characterized in that the rotation stop element is realized such that, when at least a part of the rotation stop element is displaced towards the stacking zone, it acts on the stacking element to prevent action of the stacking element on the movable nut and to itself act on the movable nut.

4. Nut stacking mechanism according to claim 1, characterized in that the complete rotation stop element is arranged displaceably, viewed in the longitudinal direction of the spindle.

5. Nut stacking mechanism according to claim 1, characterized in that the movable nut comprises a notch (9) in its periphery, and in that the rotation stop element is designed to engage in this notch (9) to prevent rotation of the movable nut.

6. Nut stacking mechanism according to claim 1, characterized in that the stacking element is arranged displaceably, viewed in the longitudinal direction of the spindle.

7. Nut stacking mechanism according to claim 1, characterized in that the movable nut comprises a flange, and in that the stacking element is designed to engage behind this flange to prevent sliding of the movable nut.

8. Nut stacking mechanism according to claim 1, characterized in that the nut is provided with an external screw thread with pitch P2, and in that the stacking element is designed to engage in the external screw thread of the nut.

9. Nut stacking mechanism according to claim 8, characterized in that the stacking element comprises teeth with pitch P2 equal to the pitch P2 of the external screw thread of the nut.

10. Nut stacking mechanism according to claims 6, characterized in that the rotation stop element and the stacking element form part of a same displaceable lath, wherein an untoothed part of this lath forms the rotation stop element and a toothed part of this lath forms the stacking element, which toothed part is provided with a toothing with pitch P2.

11. Nut stacking mechanism according to claim 10, characterized in that the untoothed part of the lath is thinner than the toothed part of the lath.

12. Nut stacking mechanism according to claim 6, characterized in that the displaceable part of the rotation stop element and the stacking element form part of a movable chain comprising a zone B and a zone A, wherein this chain, at least at the height of the stacking zone, runs parallel with the rotatable spindle, wherein the chain in zone A comprises links which are realized as the stacking element and, for this purpose, comprise teeth to engage in the external screw thread of the movable nut, and wherein the chain in zone B comprises links which are realized as the rotation stop element.

13. Nut stacking mechanism according to claim 1, characterized in that the nut stacking mechanism comprises a second rotatable spindle, having an external screw thread with pitch P2, comprises a second nut, with internal screw thread P2, with which the rotation stop element is movably fastened on this second spindle, whereby movement of the second nut in the rotational direction of the second spindle is prevented, so that absolute rotation of the second nut and the rotation stop element with respect to the second spindle is prevented and movement of the second nut and the rotation stop element in the longitudinal direction of this second spindle is unhindered.

14. Nut stacking mechanism according to claim 2, characterized in that the rotation stop element and the stacking element form part of a lever, in that the nut is placed in a bearing, in that the lever comprises a cavity (27), which extends through the lever and into which the nut and the bearing extend, in that the lever is arranged tiltably with respect to the nut between a first position and a second position, and in that the lever is constructed such that in the first position the bearing is locked by friction, so that the lever serves as a rotation stop element, and in the second position the nut is freely mounted, so that the lever serves as a stacking element.

15. Nut stacking mechanism according to claim 14, characterized in that the nut stacking mechanism comprises an activation element, which is arranged displaceably in a direction virtually parallel to the rotatable spindle in order to act on the lever to tilt this between its first position and its second position.

16. Nut stacking mechanism according to claim 15, characterized in that the nut stacking mechanism comprises a second rotatable spindle, having an external screw thread with pitch P3, wherein the activation element is movably fastened to this second spindle with the aid of a second nut with internal screw thread P3.

17. Slat structure comprising a nut stacking mechanism for the displacement of slats between a stacking zone and a sliding zone, characterized in that the nut stacking mechanism is a nut stacking mechanism according to claim 1.

* * * * *